(12) United States Patent
Rai et al.

(10) Patent No.: US 9,198,083 B1
(45) Date of Patent: Nov. 24, 2015

(54) INTEGRATED PAGING MECHANISM

(71) Applicant: Sprint Spectrum L.P., Overland Park, KS (US)

(72) Inventors: Deveshkumar Rai, Overland Park, KS (US); Kristin A. Hayne, Overland Park, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 14/053,483

(22) Filed: Oct. 14, 2013

(51) Int. Cl.
*H04W 72/00* (2009.01)
*H04W 28/18* (2009.01)
*H04W 68/12* (2009.01)

(52) U.S. Cl.
CPC .............. *H04W 28/18* (2013.01); *H04W 68/12* (2013.01)

(58) Field of Classification Search
CPC ... H04W 76/02; H04W 72/04; H04W 72/085; H04W 68/12; H04W 68/025; H04W 68/02; H04W 68/00
USPC ........ 455/404.2, 420, 422.1, 436, 435.3, 450, 455/458, 452.1, 456.1; 370/329, 328, 338, 370/331, 341
See application file for complete search history.

(56) References Cited

U.S. PATENT DOCUMENTS

| 2003/0083081 A1* | 5/2003 | Sanders et al. ................. 455/466 |
| 2006/0270422 A1* | 11/2006 | Benco et al. ................... 455/458 |
| 2012/0034910 A1* | 2/2012 | Fang et al. ................. 455/422.1 |

* cited by examiner

*Primary Examiner* — Babar Sarwar

(57) ABSTRACT

Illustrative methods and systems may help to more efficiently use network resources in fall back scenarios. An illustrative method involves a network component: (a) receiving a first paging request directed to a target user-entity (UE) for a first communication of a first communication type, (b) initiating a first paging process to page the target UE for the first communication, (c) before the first paging process is complete, receiving a second paging request directed to the target UE, wherein the second paging request is for a second communication of a second communication type, wherein the second communication type that has a higher priority than the first communication type, and (d) in response: (i) refraining from assigning network resources for the first communication, and (ii) using a result of the first paging process to determine whether or not to assign network resources for the second communication.

20 Claims, 6 Drawing Sheets

INTEGRATED PAGING MECHANISM

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to Long Term Evolution (LTE) standards, the antenna system is usually referred to as a NodeB or an eNodeB, and the entity that typically coordinates functionality between multiple eNodeBs is usually referred to as a mobility management entity (MME). Other architectures and operational configurations of a RAN are possible as well.

A subscriber (or user) in a service provider's wireless communication system accesses the system for communication services via a communication device, such as a cellular telephone, "smart" phone, pager, or appropriately equipped portable computer, for instance. In a CDMA system the communication device is referred to as an access terminal (also referred to herein by "AT"); in an LTE system the communication device is referred to as user equipment (also referred to herein by "UE"). When an AT or UE is positioned in a cell, it communicates via an RF air interface with the BTS or eNodeB antenna of the cell. Consequently, a communication path or "channel" is established between the AT or UE and the transport network, via the air interface, the BTS or eNodeB, the BSC or MME, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or eNodeB, or by respective antennas. These sectors can be referred to as "physical sectors," since they are physical areas of a cell site. Therefore, at any given instant, an AT or UE in a wireless network will typically be positioned in a given physical sector and will be able to communicate with the transport network via the BTS or eNodeB serving that physical sector.

Functionally, a BTS of a cell or an eNodeB may be referred to as a "base station." The actual physical configuration of a base station can range from an integrated BTS-BSC or eNodeB unit to a distributed deployment of multiple BTSs under a single BSC, or multiple eNodeBs under a single MME. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). A carrier could also implement an orthogonal frequency division multiple access (OFDMA) based system according to protocols specified by third generation partnership project (3GPP) Long Term Evolution ("LTE") Advanced, for example. Access terminals or UEs may be capable of communication under any or all such protocols, and may further be capable of handing off between them, in addition to being able to hand off between various configurations of coverage areas.

OVERVIEW

In networks that provide service under both Long-Term Evolution (LTE) and an older CDMA protocol (e.g., IS-2000 and/or IS-856), service providers may implement circuit switch fallback (CSFB) and/or enhanced circuit switch fallback (eCSFB) functionality, both of which allow service providers to use their older existing CDMA network for voice calls, while at the same time using LTE to support mobile broadband.

Under certain implementations of CSFB, a wireless communication device may, by default, operate with its CDMA receiver powered down, and only listen for pages via an LTE paging channel. Thus, when a radio access network (RAN) needs to page a wireless communication device for a circuit-switched call, the RAN may first page the wireless communication device via an LTE paging channel to establish a Radio Resource Connection (RRC) and send 1x-specific information to prepare the device to switch to the 1x network for the circuit-switched call. This indicates to the wireless communication device that it should turn on its CDMA receiver and listen to the CDMA paging channel for a page. The RAN can then send the page via the CDMA paging channel. Thus, a wireless communication device operating under CSFB may keep its CDMA receiver powered down, except when it is instructed to switch to a 1x network for circuit-switched services.

When eCSFB is implemented, a radio access network (RAN) may generally use its 3G traffic channels for voice calls and 1x-data calls, while using LTE signaling channels for all other functionality. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality.

However, CSFB and eCSFB may lead to operational inefficiencies when the paging controller of an LTE network (e.g., a mobility management entity (MME)) pages a UE for an LTE data communication, and then receives a paging request for a 1x eCSFB call with the same UE before a page response message for the LTE data communication is received from the UE. In this scenario, the MME may ignore the paging request for the 1x eCSFB call, and proceed to wait for the paging response message for the LTE data communication. If the response for the LTE data communication is received, then the MME may proceed to set up bearer communications with the service gateway (S-GW) of the LTE network. And, if the internetwork function (IWF) of the 1x CDMA network is only configured to send one request to the MME, then the 1x eCSFB call will fail.

Alternatively, if the IWF is configured for multiple paging attempts, the MME may receive a second paging request for the 1x CDMA call, after the LTE data communication has been set up. In this scenario, the MME may engage in a standard CSFB or eCSFB process; e.g., by suspending the data communication and paging the UE to set up the 1x CDMA call. (Note that, in this scenario, a 1x CDMA call may also be referred to as a 1x eCSFB or 1x CSFB call.) In practice, because of the timing with which the IWF re-transmits the paging request for 1x eCSFB call, an LTE data communication can be suspended almost immediately after it is set up. Such inefficient use of resources may be undesirable.

Further, if paging for the LTE data communication is not successful, this is likely an indication that the UE cannot be reached, and that a paging process initiated shortly thereafter is also unlikely to succeed. However, in the event that a 1x is received shortly or even immediately after paging for an LTE data communication has failed, current MME implementations may none-the-less page the UE for the 1x eCSFB call. The foregoing scenarios may thus lead to inefficient use of network resources when CSFB or eCSFB is implemented.

Accordingly, exemplary embodiments may help to improve the manner in which a paging controller handles contention between pages from different access networks. For example, a controller (e.g., an MME) may be configured to receive paging triggers from various bearer connection systems (e.g., paging requests from a service gateway (S-GW) for incoming data to be transmitted to a UE via LTE, and from a 3G RAN for an incoming call to be connected to the UE via CDMA or another 3G protocol). According to an exemplary embodiment, if the paging controller faces a contention between those paging triggers, the paging controller will select the system that has a higher priority and will page for that system.

More specifically, if the paging controller has begun paging a UE for a first system and then receives a trigger for paging the UE for a second system, the paging controller will treat the UE's response to the page for the first system as being a response to a page for the second system. For instance, if the second system is deemed higher priority than the first system, and if the UE responds to the page, the paging controller may treat that as though the UE had responded to the second system instead, to facilitate setup of the communication for the second system instead of for the first system (and abandon setup of the communication for the first system). Further, regardless of priorities, if the UE does not respond to the page for the first system, the paging controller may treat that as not only a failure to respond to a page for the first system (so that the first system will not set up its communication to the UE), but will also treat it as a failure to respond to a not-yet-transmitted page for the second system (so that the second system will also not set up its communication to the UE).

In one aspect, an exemplary method involves: (a) receiving, by a network component, a first paging request directed to a target UE, wherein the first paging request corresponds to a first communication of a first communication type, (b) in response to the first paging request, the network component initiating a first paging process to page the target UE for the first communication, (c) before the first paging process is complete, receiving, by the network component, a second paging request directed to the target UE, wherein the second paging request corresponds to a second communication of a second communication type, wherein the second communication type that has a higher priority than the first communication type, and (d) in response to the second paging request, the network component: (i) refraining from assigning network resources for the first communication, and (ii) using a result of the first paging process to determine whether or not to assign network resources for the second communication.

In another aspect, an exemplary system comprises: (a) a first communication interface configured to receive paging requests for communications of a first communication type, (b) a second communication interface configured to receive paging requests for communications of a second communication type, wherein the second communication type has a higher priority than the first communication type, and (c) a computing system configured to: (i) receive, via the first communication interface, a first paging request that is directed to a target UE, wherein the first paging request is for a first communication of the first communication type, (ii) in response to the first paging request, initiate a first paging process to page the target UE for the first communication, (iii) before the first paging process is complete, receive, via the second communication interface, a second paging request that is directed to the target UE, wherein the second paging request is for a second communication of the second communication type, and (iv) in response to receipt of the second paging request before the first paging process is complete: (a) refrain from assigning network resources for the first communication, and (b) use a result of the first paging process to determine whether or not to assign network resources for the second communication.

In a further aspect, a non-transitory computer readable medium has stored therein instructions that are executable by a computing device to cause the computing device to perform functions comprising: (a) receiving, by a network component, a first paging request directed to a target UE, wherein the first paging request corresponds to a first communication of a first communication type, (b) in response to the first paging request, the network component initiating a first paging process to page the target UE for the first communication, (c) before the first paging process is complete, receiving, by the network component, a second paging request directed to the target UE, wherein the second paging request corresponds to a second communication of a second communication type, wherein the second communication type that has a higher priority than the first communication type, and (d) in response to the second paging request, the network component: (i) refraining from assigning network resources for the first communication, and (ii) using a result of the first paging process to determine whether or not to assign network resources for the second communication.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. EXEMPLARY COMMUNICATION SYSTEM ARCHITECTURE

Figure 1:
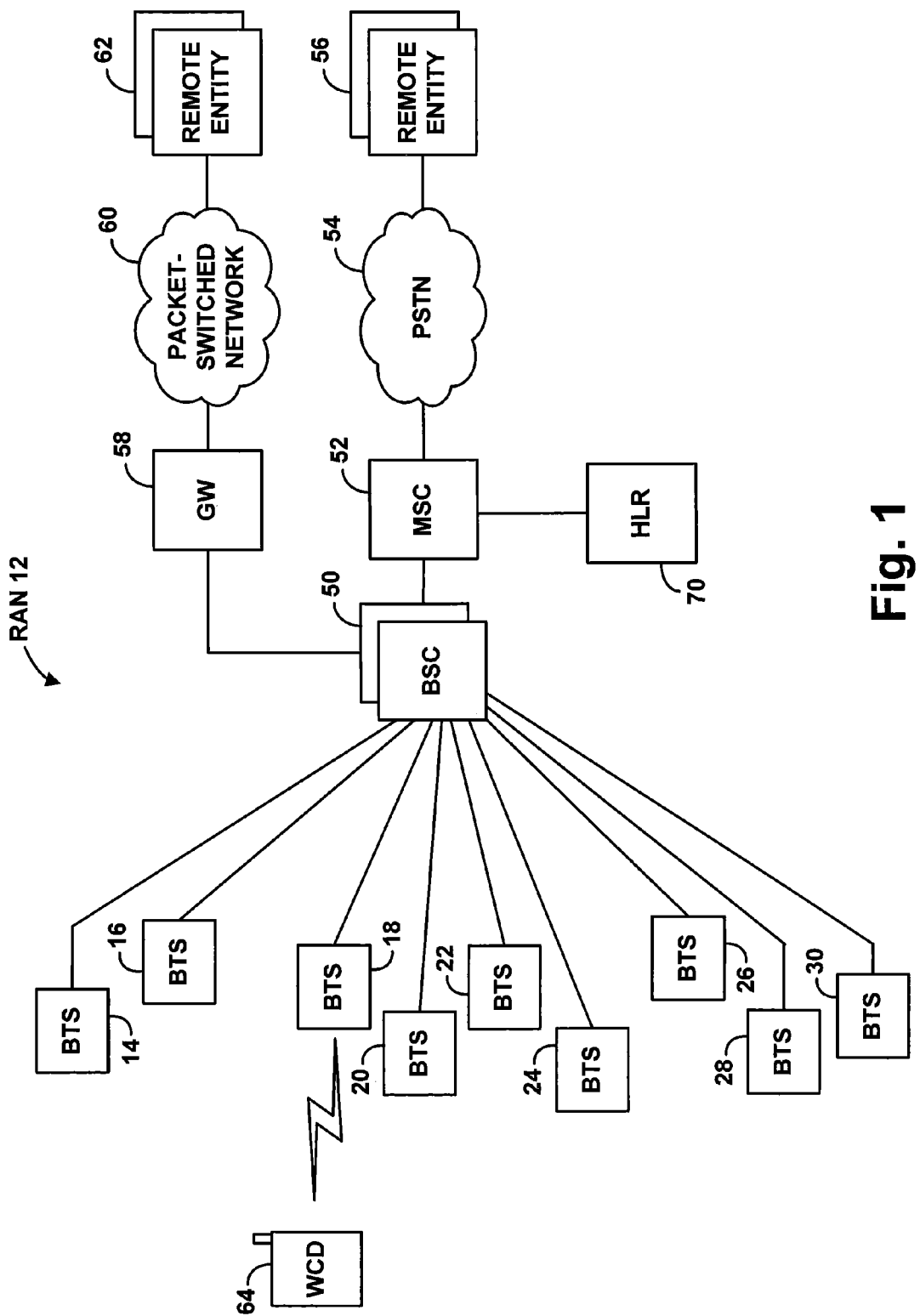
FIG. 1 is a block diagram illustrating a wireless communication network, according to an exemplary embodiment.

Referring to the Figures, FIG. 1 is a block diagram illustrating a wireless communication network, according to an exemplary embodiment. As noted, service providers may implement networks in which service is provided under a CDMA standard (e.g., IS-95, IS-2000, 1xRTT, 1xEV-DO, etc.) as well as under a 4G protocol such as LTE and/or WiMax. Service under both CDMA and LTE (or WiMAX) may be implemented in conjunction with the arrangement shown in FIG. 1 as well as in other configurations. Further, more specific details of an illustrative network with overlapping CDMA and LTE will be discussed in reference to FIG. 2.

As shown in FIG. 1, an exemplary network may include a radio access network (RAN) 12 that radiates to define numerous coverage areas in which wireless communication devices (WCDs) can engage in RF communication with the RAN. Herein, WCDs may also be referred to as "mobile stations" or "access terminals" as is common when referring to WCDs in the context of a CDMA network, and also as "user entities" (UEs), as is common when referring to WCDs in the context of an LTE network. Thus, the terms "mobile station," "wireless communication device" (or WCD), "access terminal," and "user entity" (or UE) may be used interchangeably herein. Further, a WCD may be classified herein based on whether or not it is configured for circuit switch fallback (CSFB) and/or enhanced circuit-switched fallback (eCSFB) functionality, and thus may be referred to as either a "CSFB device" or a "non-CSFB device."

The RAN 12 may define these coverage areas discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include one or more base stations (also referred to as "base transceiver stations" (BTSs)), designated in the figure as base stations 14-30, and one or more base station controllers (BSCs) 50 (which may be integrated with or separate entities from the one or more of the base stations). The base stations preferably include directional antennas, power amplifiers, and associated transceiver equipment arranged to establish corresponding wireless coverage areas and to communicate with WCDs in those coverage areas.

The coverage areas served by base stations 14-30 may be cell sectors, or some other defined wireless coverage area (possibly even a combination of coverage provided by multiple base stations). Each base station 14-30 may serve a single coverage area (e.g., a single cell or sector), or may serve multiple discrete coverage areas, such as multiple sectors, for instance.

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

FIG. 1 depicts a representative WCD 64 by way of example, which could be a cell phone, tablet, laptop computer, wirelessly equipped personal digital assistant (PDA), personal computer, home electronic device, or any other type of wirelessly-equipped device now known or later developed. The WCD 64 is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above.

Further, a WCD 64 may include a user interface, which typically includes components for receiving input from a user of a WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each mobile station, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN). Further, in the context of LTE or other similar protocols, a WCD may be referred to as a UE and may have a UE identity.

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
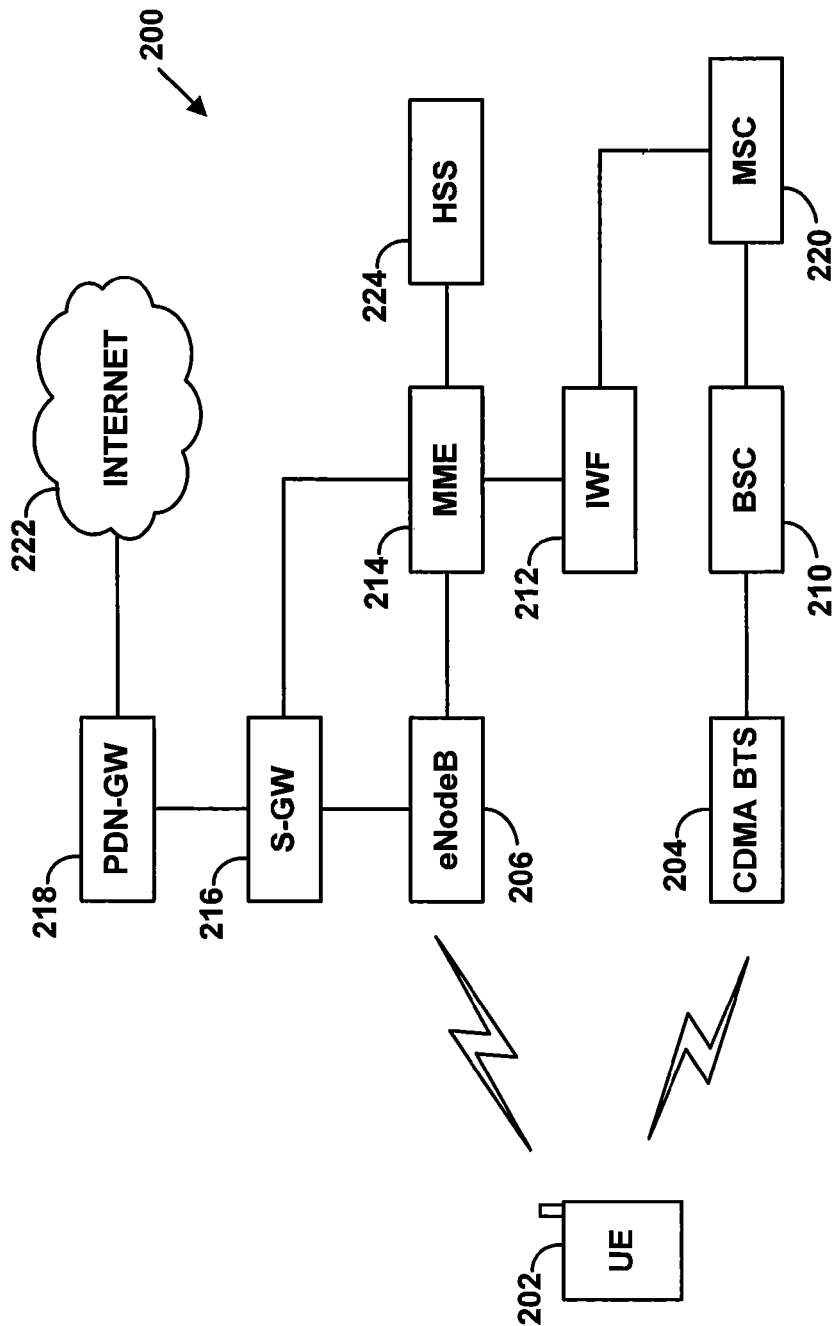
FIG. 2 is a simplified block diagram of a wireless communication network in which a service provider supports wireless service under two or more different air interface protocols, according to an exemplary embodiment.

As noted above, FIG. 2 is a simplified block diagram of a wireless communication network 200 in which a service provider supports wireless service under two or more different air interface protocols. In particular, FIG. 2 shows an exemplary RAN that is configured to provide service under both CDMA and LTE. As such, a UE 202 operating in network 200 may connect and communicate under different air-interface protocols, such as CDMA and LTE. In practice, network 200 may include two or more separate access networks with overlapping coverage areas (e.g., separate access network for LTE and CDMA). Alternatively, some or all components may be combined so as to support both CDMA and LTE communications, for example.

In the illustrated configuration, network 200 includes components to provide for CDMA communications. Specifically, FIG. 2 shows a BTS 204, a BSC 210, and an MSC 220, which collectively (and possibly in conjunction with other components that help to provide service under CDMA) may be referred to as a CDMA network. Note that BTS 204, BSC 210, and MSC 220 may be configured for the same or similar functions as BTSs 14-30, BSC 50, and MSC 52, which were described in reference to FIG. 1.

Network 200 also includes components to provide a UE 202 with service under LTE. In particular, network 200 includes one or more eNodeBs 206, which are base stations configured to support over-the-air communications with UEs 202 under LTE. Each eNodeB 206 may provide service under LTE in one or more coverage areas, such as a cell or one or more cell-sectors.

To support LTE communications, network 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, security functions, authentication of UEs, gateway selection for communications, and so on. Further, in the context of paging, an MME may function as a paging controller that distributes paging messages to the appropriate eNodeBs for transmission to UEs. Accordingly, where appropriate, the paging functionality described in reference to an MME herein may also be implemented by other entities or combinations of entities that function as a paging controller.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network may include a packet data network gateway (PDN-GW) 218, which facilitates packet-data communications between an S-GW 216 that operates according to LTE, and a packet-data network, such as the Internet 222.

Under LTE, a UE 202 may operate in one of three possible states, LTE_DETACHED, LTE_IDLE, and LTE_ACTIVE. A UE 202 typically operates in the LTE_DETACHED state while it is searching for and registering with the network. A UE 202 typically operates in the LTE_ACTIVE state once it has registered with the network and has a radio resource control (RRC) connection with an eNodeB 206 (e.g., while actively engaged in a communication). Further, a UE 202 typically operates in the LTE_IDLE state when it is registered, but is not engaged in a communication, and thus does not have an RRC connection.

In an exemplary embodiment, a wireless telecommunications network 200 may be operable to page UE 202 for various reasons. For example, when UE 202 is operating in the LTE_IDLE state (e.g., when the UE is not actively engaged in communication), MME 214 may receive an indication of an incoming communication directed to UE 202, or otherwise determine that communication with UE 202 is needed. Accordingly, MME 214 may send a paging request to the eNodeB 206 (or possibly multiple eNodeBs) that are believed to be near the UE 202, so that UE 202 can be paged.

More specifically, to facilitate the tracking and paging of a UE 202 in an LTE network, the LTE network may include a number of defined "tracking areas." Each tracking area includes a group of coverage areas (e.g., cells), which are typically contiguous. Further, a network 200 may implement static non-overlapping tracking areas, overlapping tracking areas (e.g., where adjacent tracking areas share one or more cells), or a combination thereof, depending upon the particular implementation. Accordingly, an MME 214 may initiate the paging procedure by sending a paging message to each eNodeB 206 that serves cells in the tracking area or tracking areas in which a UE 202 is currently registered.

Each UE 202 may maintain or have access to a tracking area list (a "TAI list"), which indicates the tracking area or areas in which the UE is currently registered. Accordingly, when a UE 202 enters a tracking area in which it is not currently registered it may implement a zone-update process to register in the new tracking area. Specifically, under LTE, the UE 202 may start a tracking-area update procedure when by sending the tracking area update request message to the access network (e.g., to an MME 214 or another network entity). The request message may indicate a Globally Unique Temporary ID (GUTI) which identifies the particular UE 202, as well as the TAI list for the UE 202.

If an MME 214 accepts a tracking area update request, the MME may send a tracking area update accept message to the UE 202 via eNodeB 206. The tracking area update accept message may include a new GUTI and/or an updated TAI list, if either has changed. In response, the UE 202 may send the MME 214 a tracking area update complete message (via eNodeB 206). On the other hand, if the update request is not accepted, the MME 214 sends a tracking area update reject message, which may indicate a reason for the rejection.

In a further aspect, network 200 may include or be in communication with an interworking function (IWF) 212. IWF 212 is a functional component that supports interworking between different wireless technologies, such as CDMA and LTE. Note that an IWF may also be referred to as an internetworking service (IWS). In an exemplary configuration, IWF 212 may support communications between components of an LTE network (e.g., MME 214) and components of a CDMA network (e.g., BSC 210 and/or MSC 220), so that a service provider may implement CSFB or eCSFB functionality. As such, IWF 212 may be implemented by an entity or entities of the CDMA network, such as the MSC and/or HSS, for instance. An IWF 212 may also be implemented by other entities.

A UE 202 that is configured for CSFB and/or eCSFB may register with the CDMA-portion of system 200 via an LTE network 201. For example, a UE 202 may send CDMA registration messages via an eNodeB 206 and an MME 214. The IWF 212 may be configured to encapsulate and relay such CDMA registration messages to MSC 220, in order to register UEs with the CDMA network 203.

As part of the registration process, a UE 202 may receive a system information block (SIB) message referred to as a "SIB8 message," which is broadcasted periodically by the LTE network and includes system information for the CDMA network. The provided system information may help a UE access and connect to the CDMA network. For example, a SIB8 may include a channel list that indicates one or more CDMA channels (in one or more CDMA coverage areas) that overlap with and/or are near to the UE's current location (e.g., that overlap with and/or are near to the coverage area of the LTE network in which the UE is the registering).

To facilitate CSFB and/or eCSFB functionality, an LTE network 201 may use, e.g., S102 tunnel redirection, to establish an LTE tunnel between an IWF 212 and a UE 202 via MME 214 and eNodeB 206. IWF 212 may then use the LTE tunnel for CDMA messaging with the UE 202 (e.g., messaging that would typically have occurred over a CDMA paging channel and/or a CDMA access channel). Accordingly, when a UE 202 connects to LTE network 201 via an eNodeB 206, it can communicate with CDMA MSC 220 through IWF 212, which functions to bridge the LTE network 201 and CDMA network 203, and to encapsulate and relay CDMA messages between the UE 202 and the MSC 220.

Under CSFB, a UE 202 may, by default, operate with its CDMA receiver powered down, and only listen for pages via an LTE paging channel. Thus, when a RAN needs to page a wireless communication device for a voice call, the LTE network 201 may first page the UE via an LTE paging channel. In particular, when the 3G (e.g., CDMA) network 203 seeks to page a UE, the CDMA network 203 sends a page message to the LTE network 201, which then sends the page message to the UE 202. To do so, the IWF 214 may send the page message via the MME 214 to the eNodeB 206 that is serving the UE 202, so that the eNodeB 206 can transmit the page message to the UE. The UE 202 may then respond by, e.g., sending an Extended Service Request (ESR) message to the LTE network 201 to indicate a switch back to the CDMA network 203. Upon such response from the UE 202, the eNodeB 206 may send a message to the UE to direct the UE to connect to the CDMA network 203 and suspends LTE service to the UE.

The UE 202 then scans for CDMA coverage and goes through an acquisition process with the CDMA network, including, for example, reading the pilot and sync channels, and requesting and receiving assignment of a traffic channel. For example, the UE 202 may then power on its CDMA receiver, scan the channel or channels that are designated for fall back to the CDMA network, send a page response message to the CDMA network 203, and proceed to conduct the voice call via the CDMA network 203.

When eCSFB is implemented, a RAN may generally use its CDMA traffic channels for voice calls and 1x-data calls, while using LTE signaling channels for paging and access control for both LTE and CDMA signaling. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality. In particular, in an eCSFB scenario, when the 3G (e.g., CDMA) network 203 seeks to page a UE 202, the CDMA network sends a signal to the LTE network 201 via IWF 212, which in turn sends the signal to the UE via MME 214 and eNodeB 206.

However, in contrast to a standard CSFB scenario, once the UE 202 responds to the eNodeB 206, the IWF 212 sends access information to the UE and coordinates with the CDMA network 203 to set up the CDMA connection for the UE. In particular, the LTE network 201 may send the UE 202 a pilot measurement request. The UE 202 may then measure the pilot signal strength of any pilot signals detected on the channels indicated in a downlink control channel (DL_DCCH) message, and send a measurement report to the LTE network 201 identifying detected channels and/or corresponding pilot-signal strengths to the IWF 212 via the LTE tunnel. In addition, the UE 202 may send a CDMA page response message to the IWF via the LTE tunnel. The IWF can then provide the pilot strength measurement report and/or the page response message to CDMA MSC 220.

The CDMA MSC 220 may then select a sector (e.g., corresponding to one of the measured pilot signals) in which the UE 202 should connect. The IWF 212 of MSC 220 can then communicate with the CDMA BTS 204 that serves the assigned sector so that the BTS can reserve resources and/or set up a traffic channel for the UE 202 to use for a voice call. The IWF 212 also sends a channel assignment message, such as an Extended Channel Assignment Message (ECAM), to the UE 202 via the LTE tunnel. The channel assignment message may indicate the assigned CDMA traffic channel. The UE 202 then quickly moves over to operating on the assigned CDMA channel, without needing to go through the acquisition process that it would go through with standard CSFB. As a result, the eCSFB process may be faster than a standard CSFB process as far as setting up a call for the UE on the CDMA network 203.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

II. EXEMPLARY RAN COMPONENTS

Figure 3:
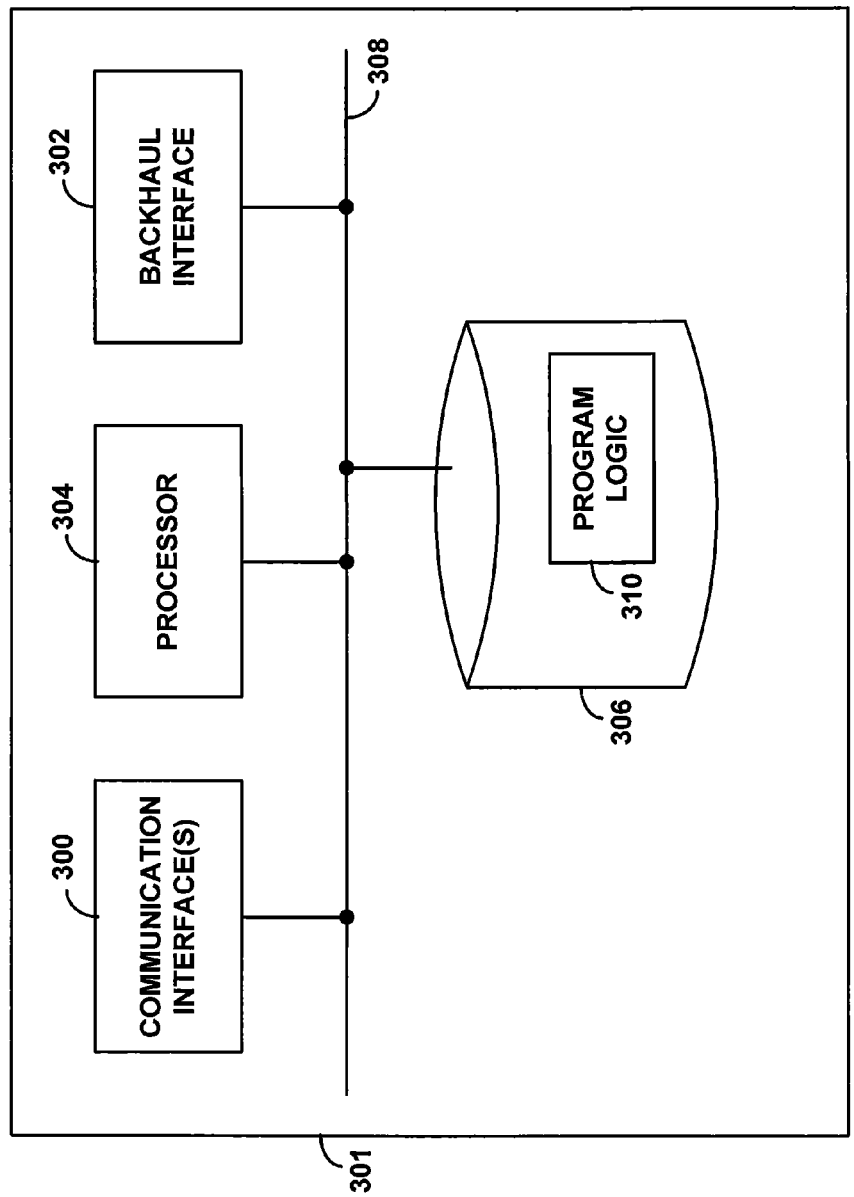
FIG. 3 is a simplified block diagram exemplifying a network component, according to an exemplary embodiment.

FIG. 3 is a simplified block diagram exemplifying a RAN component, according to an exemplary embodiment. In particular, FIG. 3 illustrates functional components that might be found in a RAN component 301 that is arranged to operate in accordance with the embodiments herein. As shown, the RAN component 301 may include a communication interface 300, a backhaul interface 302, a processor 304, and data storage 306, all of which may be communicatively linked together by a system bus, network, or one or more other connection mechanisms 308.

In practice, RAN component 301 may take the form of an MME, or may take the form of another component of an LTE or CDMA network. Further, the illustrated components of RAN component 301 (e.g., communication interface 300, a backhaul interface 302, a processor 304, and/or data storage 306) may be distributed and/or subdivided between one or more entities in an LTE network and/or in a CDMA network. It should be understood that an exemplary system may also take the form of another network entity or combinations of other network entities, without departing from the scope of the invention.

In RAN component 301, communication interface 300 may comprise one or more or wired or wireless communication interfaces and/or other associated equipment for engaging in communications with other network entities and/or for engaging in RF communications with mobile stations according to one or more air interface protocols. Backhaul interface 302 may comprise any sort of communication link or mechanism enabling the RAN component 301 to exchange signaling and bearer data with other network entities. Further, processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, communication interfaces 300 may include at least: (a) a first communication interface that is configured to receive paging requests for communications of a first communication type, and (b) a second communication interface that is configured to receive paging requests for communications of a second communication type, where the second communication type has a higher priority than the first communication type. Further, data storage 306 may include program instructions that are executable by processor 304 to: (i) receive, via the first communication interface, a first paging request that is directed to a target UE, where the first paging request is for a first communication of the first communication type, (ii) in response to the first paging request, initiate a first paging process to page the target UE for the first communication, (iii) before the first paging process is complete, receive, via the second communication interface, a second paging request that is directed to the target UE, wherein the second paging request is for a second communication of the second communication type, and (iv) in response to receipt of the second paging request before the first paging process is complete: (a) refrain from assigning network resources for the first communication, and (b) use a result of the first paging process to determine whether or not to assign network resources for the second communication.

III. EXEMPLARY METHODS

Figure 4A:
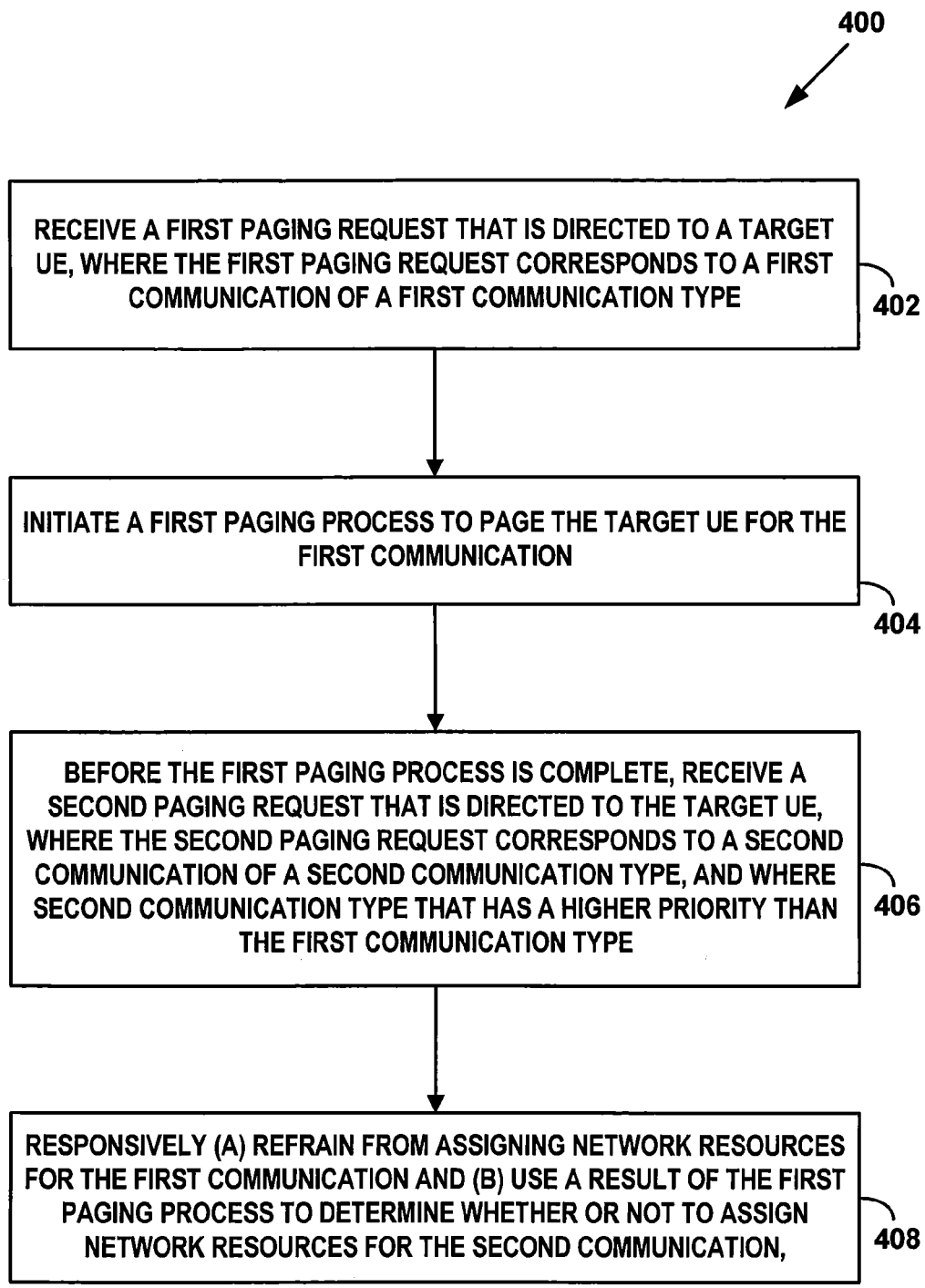
FIG. 4A is flow chart illustrating a method, according to an exemplary embodiment.

FIG. 4A is flow chart illustrating a method 400, according to an exemplary embodiment. Method 400 may be implemented by a network component, such as an MME, in an effort to more efficiently utilize network resources for paging and/or bearer setup, among other purposes. Of course, it should be understood that method 400 or portions thereof may be implemented by other entities or combinations of entities, and/or may be implemented for other purposes, without departing from the scope of the invention.

As shown by block 402, method 400 involves a network component receiving a first paging request that is directed to a target UE, where the first paging request corresponds to a first communication of a first communication type. In response to the first paging request, the network component initiates a first paging process to page the target UE for the first communication, as shown by block 404. Before the first paging process is complete, the network component receives a second paging request that is directed to the target UE, where the second paging request corresponds to a second communication of a second communication type, and where the second communication type that has a higher priority than the first communication type, as shown by block 406. In response to the second paging request, the network component: (a) refrains from assigning network resources for the first communication and (b) uses a result of the first paging process to determine whether or not to assign network resources for the second communication, as shown by block 408.

Thus, in an exemplary implementation of method 400, the network component does not initiate a second paging process when the network component receives the second paging request. Instead, the network component may refrain from initiating a second paging process, and utilize the results of the first paging process to proceed with the second process. In other words the network component may interpret the result of the first paging process as being the result of the second paging process, even though the network component never initiated the second paging process.

For example, at block 408, the determination as to whether or not to assign network resources for the second communication may be based on whether or not the network component receives a page response message indicating that the target UE successfully received a page that was sent as part of the first paging process. If the network component receives such a page response message, then the network component may proceed to assign network resources for the second communication. On the other hand, if the network component does not receive such a page response message, then the network component may determine that the second communication has failed and/or may refrain from assigning network resources for the second communication.

As a more specific example, consider the scenario where an MME initiates a paging process to page a target UE for a packet-switched (PS) data communication, and, before the paging process for the PS data communication is complete, receives a paging request for a 1x CSFB call that is directed to the same target UE. In this scenario, if the MME successfully pages the target UE for the PS data communication, the MME may treat this result as if the target UE had been successfully paged for the 1x CSFB call. On the other hand, if the paging process for the PS data communication is not successful, then the MME may treat this result as if a paging process for the 1x CSFB call had failed.

Note that in the above example, method 400 was implemented in the context of an LTE network that is configured for CSFB (or eCSFB) to fall back to a 1x CDMA network. It should be understood that method 400 could also be implemented in the context of any E-UTRAN network that is configured to fall back to a CDMA or UTRAN network, and possibly in other fallback configurations as well.

Accordingly, at block 404, the first paging process may be initiated by a component of first access network (e.g., by an MME in an LTE network) for a data communication via the first access network. Further, at block 406, the second paging request may be received by the same component of the first access network, but may correspond to a higher-priority communication, for which fall back to a second access network is required. In this arrangement, when the paging process for the data communication fails (and this result is imparted on the paging request for the higher-priority communication on the second access network), the network component may take one or more additional actions in hopes that the second communication might still be possible via the second access network. For instance, the network component of the first access network may send a message to a network component of the second access network that indicates that the second access network should page the target UE for the higher-priority communication. As a specific example, when paging for a PS data communication fails, an MME may refrain from initiating paging for a subsequent 1x CSFB call to the same UE, and may instead send a message to an IWF in the 1x network, which indicates that the 1x network should attempt to page the UE in its own network (e.g., via CDMA paging channel(s)). Other examples are also possible.

In a further aspect, when the network component receives the second paging request, at block 406, the network component may first determine whether or not the second communication has a higher priority than the first communication (based on their respective communication types). Further, the network component may only implement the remainder of method 400 when the second communication is of a type that has a higher priority than the first communication type (for which the paging process is in progress). As such, the functions of (a) refraining from assigning network resources for the first communication and (b) using a result of the first paging process to determine whether or not to assign network resources for the second communication, which are shown by block 408, may be conditioned upon the network component determining that the second communication type has a higher priority than the first communication type.

Figure 4B:
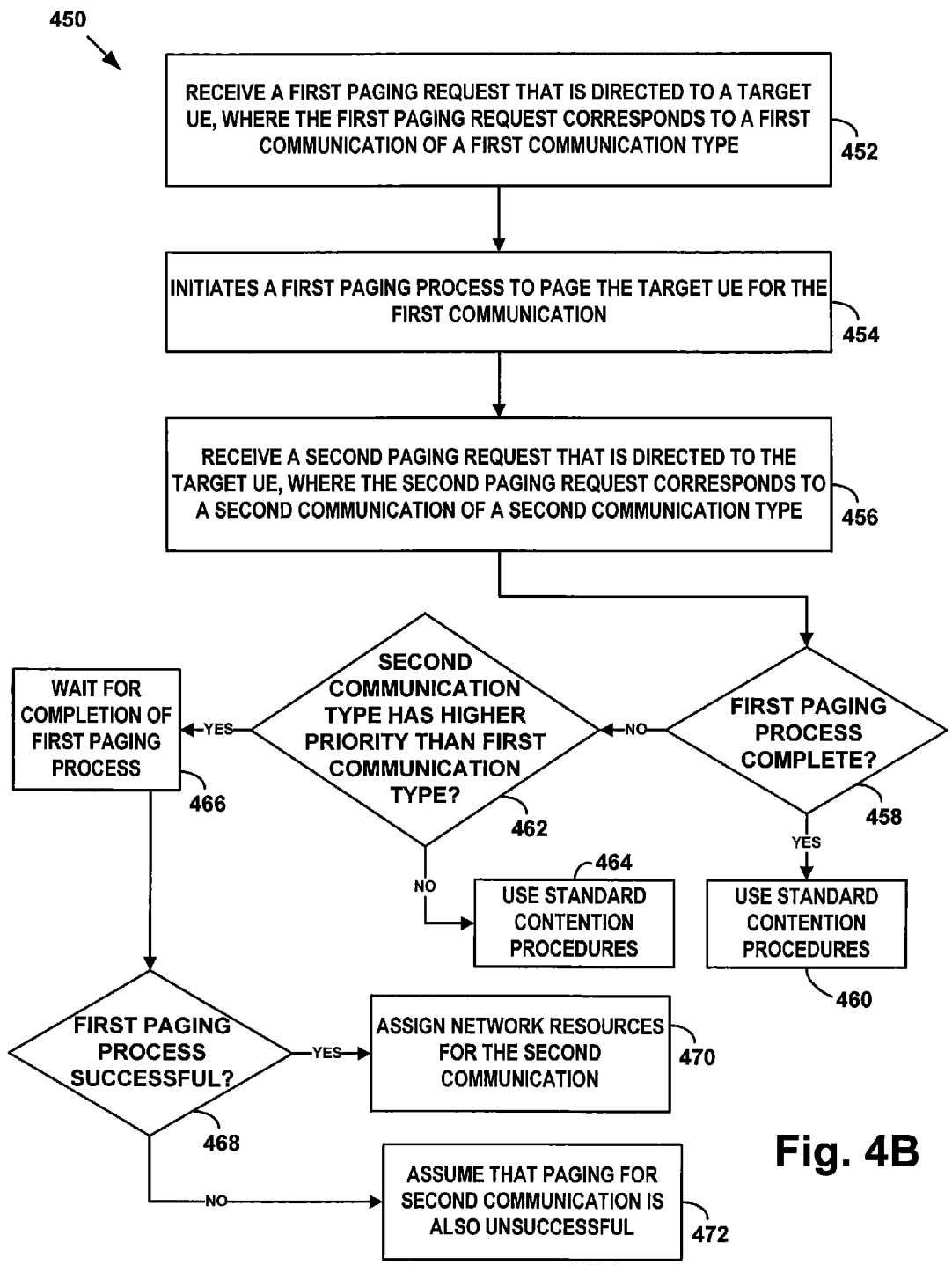
FIG. 4B is a flow chart illustrating another method, according to an exemplary embodiment.

FIG. 4B is a flow chart illustrating another method 450, according to an exemplary embodiment. Method 450 may be implemented by a network component, such as an MME, in an effort to more efficiently utilize network resources, such as LTE control channel(s). Of course, it should be understood that method 450 or portions thereof may be implemented by other entities or combinations of entities, and/or may be implemented for other purposes, without departing from the scope of the invention. According to method 450, a network component that carries out the method may actively evaluate whether or not a second communication type for a subsequent paging request is of a higher priority than a first communication type for an in-progress paging process, and condition certain functions upon a determination that the second communication type has a higher priority.

More specifically, method 450 involves a network component receiving a first paging request that is directed to a target UE, where the first paging request corresponds to a first communication of a first communication type, as shown by block 452. In response to the first paging request, the network component initiates a first paging process to page the target UE for the first communication, as shown by block 454. The network component then receives a second paging request that is directed to the target UE, where the second paging request corresponds to a second communication of a second communication type, as shown by block 456.

Upon receiving the second paging request, the network component determines whether or not the first paging process is complete (e.g., whether a paging response message has been received from the target UE), as shown by block 458. If the first paging process is complete, then the network component uses a standard process to deal with contention, as shown by block 460. For example, the network component may suspend or terminate the first communication on the network side (e.g., at S-GW), and assign radio resources for the second communication. On the other hand, if the first paging process is not complete, then the network component may determine whether or not the second communication type has a higher priority than the first communication type, as shown by block 462. If the second communication type does not have a higher priority (e.g., has a lower priority), then the network component may use a standard process to deal with the contention, as shown by block 464. For example, at block 464, the network component may determine that the second communication is not possible and take any appropriate actions in accordance with this determination, such as ceasing any efforts to assign radio resources and/or network resources for the second communication. Further, at block 464, the network component may continue the processing of paging and assigning resources for the first communication.

If the second communication does have a higher priority, then the network component may proceed to impart the result of the first paging process on the second paging request, instead of initiating a separate paging process for the second paging request. More specifically, the network component may wait for completion of the first paging process, as shown by block 466. When the first paging process is complete (e.g., when a page response message is received from the target UE), the network component may determine whether or not the first paging process was successful, as shown by block 468. If the first paging process succeeded, then the network component may assign network resources for the second communication (in the same or a similar way as if a second paging process had been initiated, and succeeded, for the second communication), as shown by block 470. On the other hand, if the first paging process failed, then the network component may determine that paging for the second communication was also unsuccessful (even though a second paging process was not initiated by the network component), as shown by block 472.

In practice, to determine whether one type of communication should be prioritized over another type, an MME or another network component may include or have access to ranking data, which ranks various communication types relative to one another. The ranking data may thus be used by the MME to determine the priority of one type communication relative to another type of communication.

In a further aspect, when the network component receives the second paging request, at block 406, the network component may first determine whether or not the second communication has a higher priority than the first communication (based on their respective communication types). Further, the network component may only implement the remainder of method 400 when the second communication is of a type that has a higher priority than the first communication type (for which the paging process is in progress). As such, the functions of (a) refraining from assigning network resources for the first communication and (b) using a result of the first paging process to determine whether or not to assign network resources for the second communication, which are shown by block 408, may be conditioned upon the network component determining that the second communication type has a higher priority than the first communication type.

Figure 5:
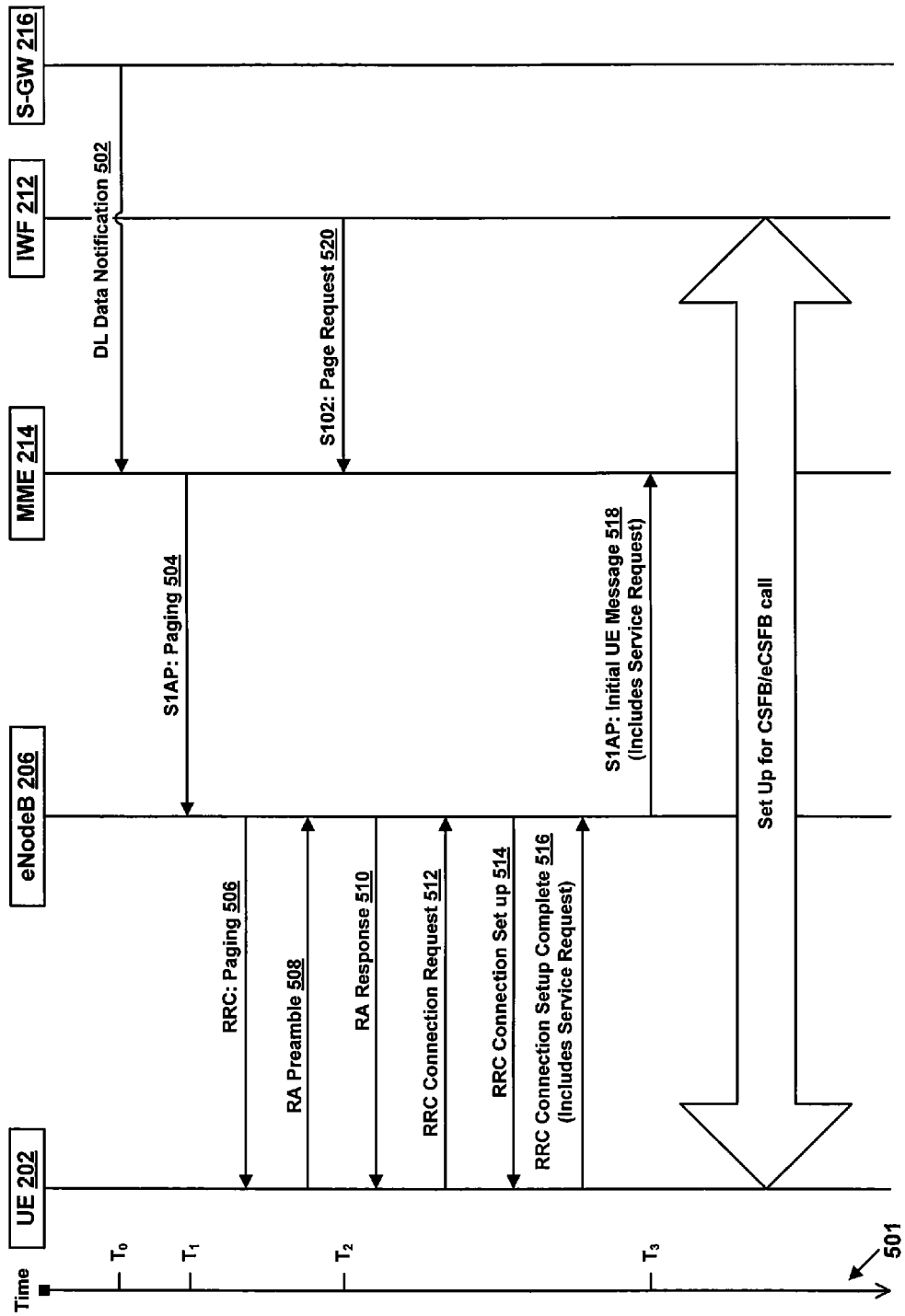
FIG. 5 is a signal flow diagram illustrating signaling in accordance with exemplary embodiments.

FIG. 5 is a signal flow diagram illustrating signaling in accordance with exemplary methods, such as methods 400 and 450. In particular, FIG. 5 shows signaling by a UE 202, an eNodeB 206, an MME 214, an IWF 212, and an S-GW 216. Further, FIG. 5 includes a timeline 501 that indicates the timing of certain signals in the signal flow diagram.

In the scenario illustrated in FIG. 5, MME 214 may initially receive a notification of an incoming data communication for a UE 202 that is in an idle mode, and may responsively initiate a paging process that is intended to wake up the UE 202 so that resources of S-GW 216 can be assigned for the data communication. In particular, MME 214 may receive a downlink (DL) Data Notification 502 from S-GW 216. In this scenario, the UE 202 is in an idle state, and thus the MME 214 may initiate paging in all the tracking areas in the TAI list of UE 202. Accordingly, MME 214 may respond to the DL Data Notification 502 by sending an S1AP Paging Message 504 to eNodeB 206 (and possibly to one or more others eNodeBs as well), which indicates to page UE 202 in the tracking areas identified in the UE's TAI list.

Upon receiving S1AP Paging Message 504, eNodeB 206 may initiate a paging process to page UE 202. For instance, in the illustrated example, eNodeB 206 may send an RRC Paging message 506 to UE 202. The RRC paging message 506 may include multiple paging records to multiple UEs. Accordingly, UE 202 may wake periodically and scan the paging channel (e.g., the Physical Downlink Control Channel (PDCCH) in an LTE coverage area) for a paging message. If the UE receives a paging message, then the UE may decode the paging message and determine whether the message includes the UE's own UE identifier.

In the illustrated example, RRC paging message 506 includes the UE identifier for UE 202. Accordingly, UE 202 may respond by initiating random access process and then a process to establish radio resource control (RRC) for the UE. In particular, UE 202 may respond to the RRC paging message 506 by sending a Random Access (RA) Preamble 508 to eNodeB 206. The eNodeB 206 then responds by sending UE 202 a RA response message, which may include a Timing Advance parameter, an uplink (UL) grant parameter, and/or a Temp C-RNTI parameter, for example. UE 202 also sends eNodeB 206 a RRC Connection Request 512, which requests radio resources be assigned to the UE, and may include a UE Contention Resolution Identity MAC control element. In response, eNodeB 206 sends a RRC Connection Setup message, which may indicate a UE Contention Resolution Identity for UE 202. The UE 202 may then send an RRC Connection Setup Complete message 516 to eNodeB 206. In the illustrated example, RRC Connection Setup Complete message 516 includes a Service Request, which may indicate that network layer resources (e.g., resources of S-GW 216) should be assigned to the UE. eNodeB 206 may then encapsulate the Service request in an S1AP Initial UE Message 518, which eNodeB 206 sends to MME 214.

In a typical scenario, MME 214 might respond to an S1AP Initial UE Message 518 that includes a Service Request for packet-switched data service by initiating processes to set up bearers for the UE to engage in packet-data communications via S-GW 216. However, in the scenario illustrated in FIG. 5, MME 214 receives a page request 520 for a 1x call from IWF 212, before the paging process for the data communication is complete. Further, the MME may include data or have access to data that prioritizes different types of communications, and thus may determine that 1x voice calls are of a higher priority than data communications. Therefore, instead of initiating processes to set up for a data communication, the MME 214 may treat the results of the paging process that was initiated for the data communication, as if this paging process had been initiated for the 1x voice call. Accordingly, MME 214 may use the RRC that was established as part of the paging process for the data communication to coordinate with IWF 212 to set up a CSFB or eCSFB call.

More generally, an exemplary MME 214 may take action when it initiates a paging process for a first type of communication (e.g., an LTE data communication), and subsequently, but before the paging process is complete, receives a paging request for a second type of communication (e.g., a 1x call). In this scenario, the MME 214 may forego initiating a separate paging process for the second type of communication, and instead utilize the results of the paging process for the first type of communication to begin setting up the second type of communication.

For instance, in the illustrated example, MME 214 initiates the paging process at time $T_1$ by sending Paging message 504, and then learns that RRC has been successfully established as a when MME 214 receives the Initial UE Message 518 at time $T_3$. Accordingly, if a paging request for a higher-priority communication is received at any time between time $T_1$ and time $T_3$, then MME 214 may treat the results of the already-initiated paging process as if they were the results of a paging process for the higher-priority communication, instead of initiating a separate paging process. In the illustrated example, since paging request 520 is for a higher-priority 1x call, and is received at time $T_2$ (between time $T_1$ and time $T_3$), MME 214 treats Initial UE Message 518 as an indication that paging was successful for the higher priority communication, and proceeds to set up a bearer with IWF 212 for a CSFB or eCSFB 1x call.

As noted above, the paging process for a data communication may be considered complete when the MME learns that RRC has successfully been established (e.g., when MME 214 receives the S1AP Initial UE Message 518 that includes the Service Request). The paging process for a data communication may also be considered complete when the process is deemed to have failed. As such, an MME 214 may also impart the results of failed paging process for a data communication on an incoming 1x call (or an incoming paging request for another type of communication having a higher priority than the data communication).

For example, at or near the time when MME 214 initiates paging for the DL Data Notification 502 (e.g., when MME sends Paging message 504), MME 214 may start a timer, which is used to determine if and when the paging process for DL Data Notification 502 should be deemed to have failed. Thus, if the timer expires before a page response message is received (e.g., before the MME receives Initial UE Message 518 or some other message that is indicative that UE 202 has received a page), then MME 214 may conclude that UE 202 cannot be reached, and that data communication with UE 202 is not possible at the time.

Further, in accordance with an exemplary embodiment, MME 214 may interpret a failure to page UE 202 for the DL Data Notification 502, as also being a failure to page UE 202 for a 1x CSFB call requested by page request 520. In this scenario, MME 214 may notify the 1x CDMA network, via IWF 212, that paging by the LTE network for the 1x CSFB call was unsuccessful. Additionally or alternatively, when paging for the 1x call via the LTE network is deemed to have failed, MME 514 might request, via IWF 212, that the CDMA network initiate paging for the 1x CSFB call.

In a further aspect, if MME 214 receives a paging request for a higher-priority communication after receiving a paging request for a lower-priority communication, but before MME 214 initiates the paging process for the lower-priority communication, then MME 214 may forego paging for lower-priority communication, and simply initiate a paging process for the higher-priority communication. For example, consider a scenario where page request 520 was not received at time $T_2$, and was instead been received at some time between $T_0$ and $T_1$. In this scenario, MME 214 may forego attempting to page UE 202 for the data communication corresponding to DL Data Notification 502, and instead initiate a paging process to establish RRC for the 1x voice call indicated by page request 520. Other examples are also possible.

IV. CONCLUSION

Note that for operational and/or commercial reasons, the telecom industry is adapting user entities and network components to be able to communicate with multiple access networks, one access network at a time. Such adaption further involves providing for signaling and information exchange between the access networks by one or more network components. CSFB and eCSFB are examples of this type of functionality. Accordingly, it should be understood that examples described herein with reference to CSFB and/or eCSFB may be applicable to any other example where a single component is configured for signaling and/or information exchange between a user entity and two or more types of access networks.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   receiving, by a network component, a first paging request directed to a target user-entity (UE), wherein the first paging request corresponds to a first communication of a first communication type;
   in response to the first paging request, the network component initiating a first paging process to page the target UE for the first communication;
   before the first paging process is complete, receiving, by the network component, a second paging request directed to the target UE, wherein the second paging request corresponds to a second communication of a second communication type, wherein the second communication type that has a higher priority than the first communication type; and
   in response to the second paging request, the network component:
      refraining from assigning network resources for the first communication; and
      using a result of the first paging process to determine whether or not to assign network resources for the second communication.

2. The method of claim 1, further comprising, as a further response to the second paging request, the network component refraining from initiating a second paging process to page the target UE for the second communication.

3. The method of claim 2, wherein using the result of the first paging process to determine whether or not to assign network resources for the second communication comprises:
   interpreting the result of the first paging process as a result of the second paging process that the network component refrained from initiating.

4. The method of claim 1, wherein using the result of the first paging process to determine whether or not to assign network resources for the second communication comprises:
   if the network component receives a page response message that indicates the target UE successfully received a page that was sent as part of the first paging process, then assigning network resources for the second communication.

5. The method of claim 4, wherein using the result of the first paging process to determine whether or not to assign network resources for the second communication further comprises, if the network component does not receive the page response message, then determining the second communication to have failed.

6. The method of claim 4, wherein using the result of the first paging process to determine whether or not to assign network resources for the second communication further comprises:
   if the network component does not receive the page response message, then refraining from assigning network resources for the second communication.

7. The method of claim 4, wherein the first paging process utilizes a first access network, and wherein using the result of the first paging process to determine whether or not to assign network resources for the second communication further comprises:
   if the network component does not receive the page response message, then sending a message to a second network component that indicates to page the target UE for the second communication via a second access network.

8. The method of claim 7, wherein the first access network comprises an LTE network, and wherein the second access network comprises a CDMA network.

9. The method of claim 1, further comprising:
   determining, by the network component, whether or not the second communication type has a higher priority than the first communication type;
   wherein the functions of (a) refraining from assigning network resources for the first communication and (b) using a result of the first paging process to determine whether or not to assign network resources for the second communication, are conditioned upon the network component determining that the second communication type has a higher priority than the first communication type.

10. A system comprising:
   a first communication interface configured to receive paging requests for communications of a first communication type;
   a second communication interface configured to receive paging requests for communications of a second communication type, wherein the second communication type has a higher priority than the first communication type; and
   a computing system configured to:
      (i) receive, via the first communication interface, a first paging request that is directed to a target user-entity (UE), wherein the first paging request is for a first communication of the first communication type;

(ii) in response to the first paging request, initiate a first paging process to page the target UE for the first communication;

(iii) before the first paging process is complete, receive, via the second communication interface, a second paging request that is directed to the target UE, wherein the second paging request is for a second communication of the second communication type; and (iv) in response to receipt of the second paging request before the first paging process is complete: (a) refrain from assigning network resources for the first communication, and (b) use a result of the first paging process to determine whether or not to assign network resources for the second communication.

11. The system of claim 10, wherein the first communication interface is configured to receive paging requests for data communications.

12. The system of claim 10, wherein the second communication interface is configured to receive paging requests corresponding to circuit-switched fallback for a voice call.

13. The system of claim 10:
wherein the system is implemented in or takes the form of a paging controller;
wherein the first paging process comprises transmission of a paging message for a data communication via a packet-switched gateway;
wherein completion of the first paging process comprises either: (a) receipt, by the paging controller, of a service request that corresponds to the paging message for the data communication, or (b) expiration of a timer without receipt of the service request of the service request message.

14. The system of claim 10, wherein, to use of the result of the first paging process to determine whether or not to assign network resources for the second communication, the computing system is configured to:
if a page response message is received that indicates that the target UE successfully received a page that was sent as part of the first paging process, then initiate a process to assign network resources for the second communication; and
otherwise, refrain from initiation of the process to assign network resources for the second communication.

15. The system of claim 14, wherein the page response message comprises a service request that corresponds to the first paging message.

16. The system of claim 14, wherein the computing system is further configured to determine that the second communication has failed if the page response message is not received.

17. The method of claim 14, wherein the first communication corresponds to a first access network, and wherein, to use the result of the first paging process to determine whether or not to assign network resources for the second communication, the computing system is configured to:
if the page response message is not received, then send a message that indicates to a second access network to page the target UE to conduct the second communication via the second access network.

18. A non-transitory computer readable medium having stored therein instructions executable by a computing device to cause the computing device to perform functions comprising:
receiving, by a network component, a first paging request directed to a target user-entity (UE), wherein the first paging request corresponds to a first communication of a first communication type;
in response to the first paging request, the network component initiating a first paging process to page the target UE for the first communication;
before the first paging process is complete, receiving, by the network component, a second paging request directed to the target UE, wherein the second paging request corresponds to a second communication of a second communication type, wherein the second communication type that has a higher priority than the first communication type; and
in response to the second paging request, the network component:
refraining from assigning network resources for the first communication; and
using a result of the first paging process to determine whether or not to assign network resources for the second communication.

19. The non-transitory computer readable medium of claim 18, wherein using the result of the first paging process to determine whether or not to assign network resources for the second communication comprises:
if the network component receives a page response message that indicates the target UE successfully received a page that was sent as part of the first paging process, then assigning network resources for the second communication.

20. The non-transitory computer readable medium of claim 18, wherein using the result of the first paging process to determine whether or not to assign network resources for the second communication further comprises, if the network component does not receive the page response message, then determining the second communication to have failed.

* * * * *